April 14, 1931.　　　F. E. ROBBENNOLT　　　1,800,570
GAS COMPRESSOR
Filed Sept. 6, 1929
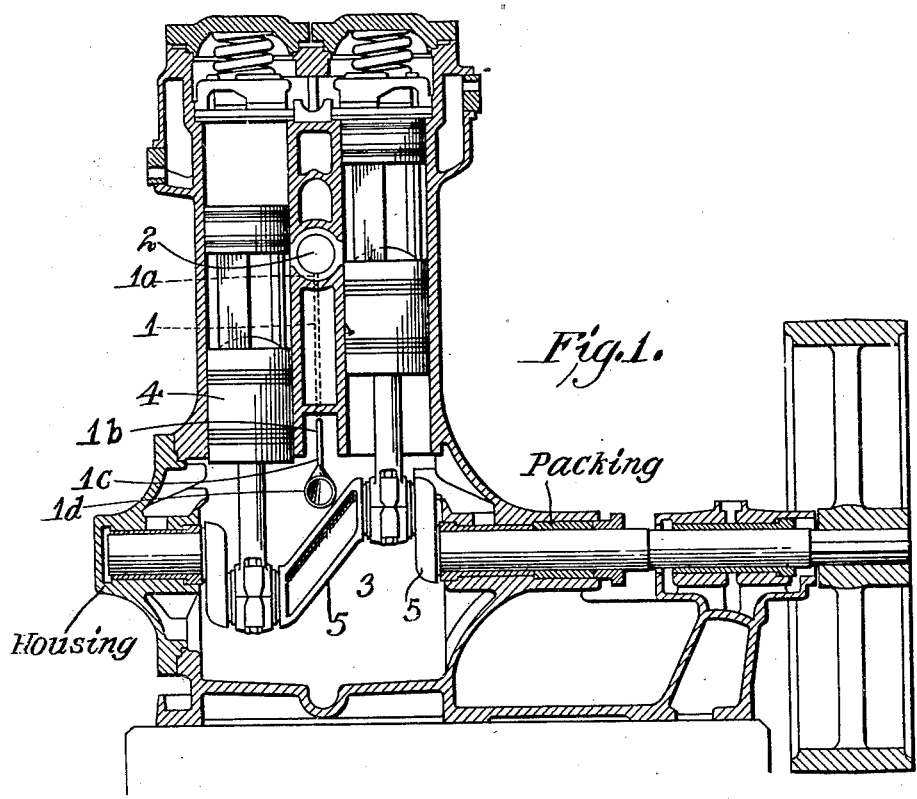
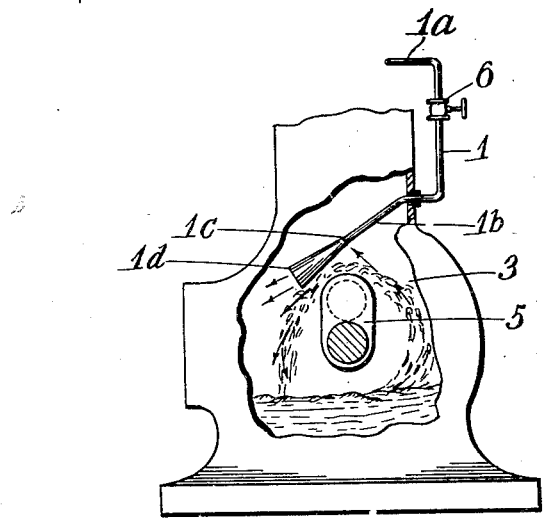
INVENTOR
Floyd E. Robbennolt
BY
George B. Willcox
ATTORNEY Patented Apr. 14, 1931

1,800,570

UNITED STATES PATENT OFFICE

FLOYD E. ROBBENNOLT, OF SAGINAW, MICHIGAN

GAS COMPRESSOR

Application filed September 6, 1929. Serial No. 390,700.

This invention relates to vertical enclosed ammonia gas compressors that comprise a belt-driven crank shaft, a vertically reciprocating trunk piston operating in an upright cylinder and valve mechanisms whereby the piston draws in ammonia gas on the down stroke and compresses and discharges it on the up stroke. Compressor to which my invention is applicable have an enclosed crank case partly filled with oil for splash lubrication of the crank shaft bearings and cylinder walls. The crank case also has at one side a closed housing for an end of the crank shaft and at the other side a packed gland in which the crank shaft is rotated by a belt pulley.

It may be noted that in the ordinary operation of a compressor of this type there unavoidably comes to the compressor, along with the ammonia gas to be compressed, more or less liquid ammonia which enters the suction inlet. During the upward stroke of the trunk piston some of the liquid finds its way down past the piston and into the crank case where it causes excessive foaming as soon as the compressor warms up, because the liquid ammonia evaporates and the resulting ammonia gas and oil mix with avidity and the whipping action of the rapidly rotating crank and connecting rod produce foam consisting of oil particles and gas whose pressure tends constantly to increase.

Two disadvantages, namely, excessive wear of the gland packing and oil priming, are inherent in such compressors. Both result from this building up of ammonia gas pressure within the crank case during the normal operation of the compressor.

Harmful wear of the gland packing is caused by a persistent endwise thrust of the crank shaft rubbing the crank slab against the end of the gland bearing, thereby heating it and injuring the packing. Such endwise thrust of the shaft is brought about by pressure of ammonia gas accumulating within the crank case and finding its way along the shaft bearing and into the housing that encloses the end of the crank shaft and there exerting pneumatic pressure against the end area of the shaft.

Oil priming occurs when the built up gas pressure in the crank case forces lubricating oil from the crank case upward between the cylinder wall and the rings of the trunk piston and thence into any charge of gas which is in the act of being compressed by the piston. The gas goes thence into the refrigerating pipe system where it reduces the rate of heat transfer and causes other serious and well-known disadvantages in the operation of the refrigerating system.

The seriousness of oil priming trouble can be made apparent by reference to a typical instance of a compressor equipped with ten and a half inch diameter piston. This compressor was found to be pumping into the refrigerating system thirty to seventy-five gallons of lubricating oil per day. In this instance the bottom part of the trunk piston skirt was worn two hundredths inch after only four or five weeks of operation.

After prolonged study and experimenting I have discovered a simple and inexpensive means for preventing the unavoidable building up of ammonia gas pressure within the crank case, thereby curing both of the stated difficulties, gland packing wear and oil priming. I accomplish both of these objects by a device that is useful and novel, although simple.

The invention is illustrated in the accompanying drawings in which Fig. 1 is a vertical sectional view of a compressor with my improvement applied thereto.

Fig. 2 is a diagrammatic view of the lower part of a compressor, partly broken away, to show the preferred arrangement of the device in relation to the cranks of a compressor.

As is clearly shown in the drawings the device comprises a vent pipe or conduit 1, an end 1a connected to the gas intake 2 of the compressor, the other end 1b communicating with the interior of the crank case 3 below the piston 4.

I preferably provide the end 1c of the vent pipe with an oil deflecting and separating element, preferably an outwardly flared mouth piece 1d, so all the particles of foam projected by the cranks 5, along the end 1c of the pipe are deflected outwardly by the mouth piece. Consequently they fly away from the orifice of intake 1d and there is presented at that place a zone which is comparatively free from oil particles. Through this zone the gas, freed from oil spray, passes relatively slowly into the vent conduit 1.

I have discovered that a certain co-operative relationship must exist between the rotating cranks and the flared suction end 1d of the relief pipe in order to most effectively separate the gas from the particles of oil. To attain that relationship the orifice of the flared end 1d of the conduit must be located with respect to the circle of crank travel so that the storm of spray particles, driven at high speed by the rapidly rotating crank, is constrained to shoot along the conduit and nozzle and thence outwardly away from the nozzle orifice in a direction substantially opposite to the direction of flow of the ammonia gas which is being drawn into the orifice. Such separator action is most effective when the nozzle opening is located close to the circle of revolution of some part of crank 5 and practically tangent thereto, although it may conceivably be located in any place where the spray particles have sufficient velocity and suitable direction to accomplish the stated object.

I find that satisfactory results are produced by a nozzle the area of whose intake orifice is about twenty-five times the area of the small end; for example a conduit 1, one-fourth inch diameter, may employ a nozzle having an opening one and one-fourth inches diameter. This proportion prevents any such intensity of gas flow into the bell mouth as might cause oil spray to be carried into it. To adjust this area-ratio a suitable regulating valve 6 is preferably provided in the conduit.

While I have shown and described the conduit as equipped with an outwardly flaring nozzle or mouth piece 1d, this being a preferred embodiment of my invention, the flared member may in some instances be dispensed with without departing from the invention as set forth in certain of the claims.

Having thus described my invention, what I claim and desire to secure by Letters Patent is:

1. In a gas compressor including a cylinder having a gas intake, a reciprocating piston, a closed crank case, a connecting rod and a crank, means for preventing building up of gas pressure in the crank case comprising a conduit communicating at one end with the gas intake, the other end of said conduit extending into the crank case in the direction of rotation of the crank to a position substantially tangential to its circle of rotation and terminating in an orifice positioned substantially at the top of said circle and means controlling the rate of gas flow through said conduit, for the purposes set forth.

2. In a vertical enclosed type ammonia gas compressor having a closed crank case, a cylinder, a piston, a connecting rod and a crank, means for preventing building up of ammonia gas pressure in the crank case comprising a gas conduit communicating at one end with the gas intake to the compressor, its other end formed to provide an outwardly flaring mouth piece, said mouth piece projecting into the crank case in the direction of rotation of the crank with its large end located in the path of spray jets caused thereby, the location of said enlarged end with respect to the jets being such that oil thrown by the cranks is deflected away from the open end of the mouth piece, while gas content of the spray is being drawn thereinto, for the purposes set forth.

3. In combination a gas compressor including a cylinder having an intake for gas to be compressed, a reciprocatng piston, a closed crank case, a crank and connecting rod and a conduit communicating with the said gas intake and with the crank case, an end of said conduit arranged to extend into the interior of the crank case in the direction of rotation of the crank and terminating in an open mouth positioned substantially tagential to the upper part of the circle of rotation of the crank, and a valve in said conduit for controlling the operation.

4. A structure as set forth in claim 2 wherein the cross sectional area of the conduit is equal to approximately one twenty-fifth of the area of its intake end.

In testimony whereof, I affix my signature.

FLOYD E. ROBBENNOLT.